United States Patent

Schwartz

[15] 3,659,783
[45] May 2, 1972

[54] TEMPERATURE REGULATED FLOW CONTROL ELEMENT FOR AUTOMOTIVE AIR-CONDITIONERS

[72] Inventor: Samuel H. Schwartz, Deerfield, Ill.
[73] Assignee: Eaton Yale & Towne, Inc., Cleveland, Ohio
[22] Filed: Oct. 24, 1969
[21] Appl. No.: 869,052

[52] U.S. Cl. ..................................236/93, 62/217, 137/468
[51] Int. Cl. .........................................................F25b 41/04
[58] Field of Search ................236/92, 34, 34.5, 93; 62/317, 62/222, 223, 224; 137/468

[56] References Cited

UNITED STATES PATENTS

| | | | |
|---|---|---|---|
| 2,268,359 | 12/1941 | Tustin | 137/468 |
| 2,873,070 | 2/1959 | Drapeau | 236/34 |
| 3,182,911 | 5/1965 | Drapeau | 236/34 |
| 3,315,890 | 4/1967 | Drapeau | 236/34 |

Primary Examiner—Meyer Perlin
Attorney—Hill, Sherman, Meroni, Gross & Simpson

[57] ABSTRACT

Thermally responsive control element in the suction side of the compressor of an air-conditioning system. The control element is in the form of a housing having an integral valve seat formed on the inner wall. A poppet valve is carried by the cup of a thermally responsive element, and is biased into engagement with the seat by a spring. A bellows forms a continuation of the cup and has communication therewith, and with the cup contains a fusible thermally responsive material. The bellows is closed at its outer end and has abutting engagement with the end of the housing. As the temperature of the evaporator reaches a point that condensed water vapor on the evaporator coils tends to freeze, the bellows will contract and allow the valve to reduce the flow of as from the evaporator to the condenser, and thereby avoid uncontrolled freeze-up of the evaporator coils and the blocking of the flow of air through said coils.

1 Claims, 2 Drawing Figures

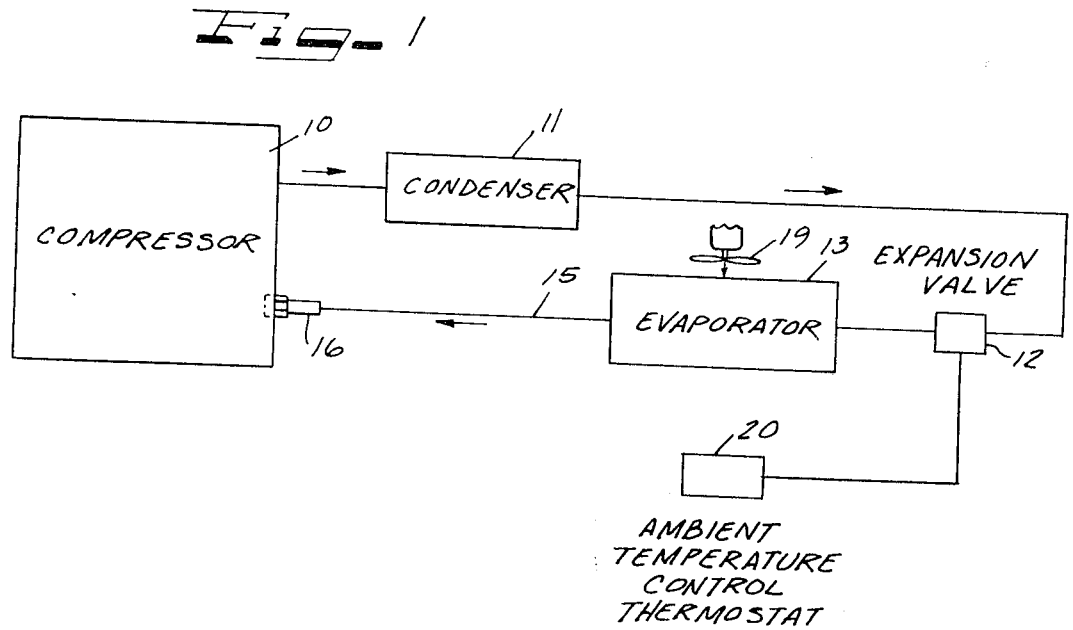
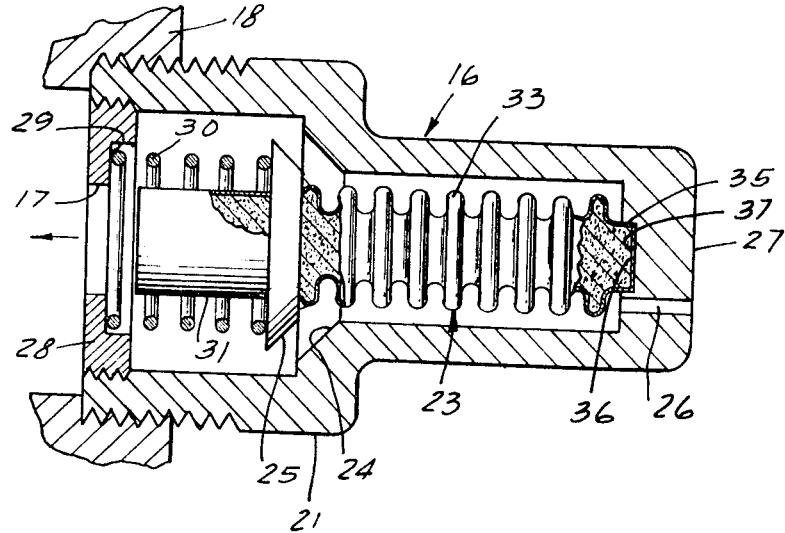
INVENTOR.
SAMUEL H. SCHWARTZ

TEMPERATURE REGULATED FLOW CONTROL ELEMENT FOR AUTOMOTIVE AIR-CONDITIONERS

BACKGROUND OF THE INVENTION

The evaporator coils of automotive air-conditioning systems frequently freeze-up due to freezing of condensate on the evaporator coils, blocking the flow of air through the coils. When this occurs, the ambient temperature rises, calling for more cooling, until the evaporator is completely blocked to the flow of air through the evaporator coils, while the refrigeration system is running at full capacity.

Heretofore, freezing has been prevented by putting a fin temperature thermostat on the evaporator, which will stop the compressor until the fin temperature of the evaporator rises above a freezing temperature. It has also been attempted to prevent this freezing by the use of hot gas by-pass valves passing out gas through the condenser coils and by the use of evaporator pressure regulating valves. Such systems require added controls, fittings and tubing and materially increase the cost of the systems and the maintenance required to maintain the system in efficient operation.

SUMMARY OF INVENTION AND OBJECTS

The control of the present invention obviates the deficiencies heretofore present in automotive air-conditioning systems, by providing a thermostatically controlled valve directly in the compressor head on the suction side of the compressor and controlling the flow of gas from the evaporator to the compressor. Where the gas temperature drops to a point where evaporator freeze-up could occur, the valve is operable by bellows type solid fill thermostatic element to restrict the gas flow to the compressor, and to thereby cause the evaporator temperature to remain above the freezing point.

A principal object of the present invention, therefore, is to prevent freeze-up of the evaporator coils of an automotive air-conditioning system, by controlling the flow of gas from the evaporator to the compressor by the temperature of the gas in the evaporator, to thereby restrict the gas flow from the evaporator and maintain the temperature coils above freezing.

Another object of the present invention is to improve upon the controls for air-conditioners by providing a simplified form of thermally responsive control valve in communication with the suction side of the compressor of a refrigerating system and connecting the evaporator with the compressor through this valve.

A still further object of the invention is to provide a simple form of thermally responsive element in the form of a cup-like casing and expansible metal bellows sealed to the cup-like casing and containing a fusible thermally responsive material, in which a valve is carried by the cup-like casing and is held in an open position by the thermally responsive material in the bellows and cup-like casing against the action of a biasing spring.

A still further object of the invention is to provide a new and improved in-line simple thermally responsive element and valve, applicable to automotive air-conditioning systems to prevent evaporator freeze-up, in which the element is in the form of an expansible bellows containing a fusible thermally responsive material and the valve is carried by the thermally responsive element.

Other objects, features and advantages of the invention will be readily apparent from the foregoing description of a preferred embodiment thereof, taken in conjunction with the accompanying drawings, although variations and modifications may be effected without departing from the spirit and scope of the novel concepts of the disclosure.

DESCRIPTION OF THE DRAWINGS

FIG. 1 is a block diagram of an automotive refrigerating system diagrammatically showing a control element constructed in accordance with the principles of the present invention, in communication of the compressor of the refrigerating system; and FIG. 2 is a transverse sectional view taken through the control element diagrammatically shown in FIG. 1, with certain parts broken away.

DESCRIPTION OF PREFERRED EMBODIMENT OF INVENTION

In FIG. 1 of the drawings, I have shown in block diagram an automotive air-conditioning system and refrigerating cycle, including a compressor 10 for raising the temperature and pressure of the gaseous refrigerant, a condenser 11 in which the refrigerant discharges its heat, an expansion valve 12 through which the liquid expands from the high-pressure level in the condenser to a low-pressure level in an evaporator 13, and a suction line 15 leading from the evaporator to the suction side of the compressor and connected to the suction side of the compressor through a temperature regulated flow control element 16, having an outlet 17 leading into a suction head 18 of the compressor 10. A blower fan generally indicated by reference character 19 forces air through the evaporator coils (not shown) to cool the interior of the vehicle, while an ambient temperature control thermostat 20, in association with the ambient temperature of the interior of the vehicle is provided to control the expansion valve 12, and the temperature of the vehicle in a conventional manner.

The temperature regulated flow control element 16 includes a housing 21 for a thermally responsive element 23. Said housing has an enlarged diameter base portion having an integrally formed internal frusto-conical valve seat 24 therein at the juncture of the large diameter base portion of said housing with a reduced diameter portion thereof leading to an end wall 27. A poppet valve 25 cooperates with said valve seat to control the flow of refrigerant gas from the evaporator through an inlet 26 leading through said end wall portion 27, and out through the outlet 17. Said outlet is shown as formed in an annular retainer 28, threaded in the enlarged diameter end portion of the housing 21. The annular retainer 28 has a recessed shouldered portion 29 extending along its inner face and forming a seat for one end of a spring 30, extending about a cup-like casing 31 of the thermally responsive element. Said spring is seated at its opposite end on the downstream side of the valve 25, and biases the valve 25 toward the seat 24. The exterior of the enlarged diameter base portion of the housing 21 is shown as being threaded in the compressor head 18.

The thermally responsive element 23 includes the cup-like casing 31, which carries the valve 25 which may be formed integrally therewith or which may be a separate valve secured to said casing in a suitable manner.

The cup-like casing 31 has an extensible metal bellows element 33 secured thereto and in communication with the interior of said casing. The casing and metal bellows element may be suitably connected together and sealed, as by soldering or brazing, or in any other conventional manner. The end of the bellows element 33 opposite the casing 31 has a reduced diameter portion 35 terminating in an integral end wall 36 which extends within a cylindrical recess 37 formed in the inner side of the end wall 27.

The cup-like casing 31 and flexible metal bellows 33 may contain a wax-type of thermally expansible material, which may be in the form of a crystalline material such as a wax having an elastic binder material in solution, in which the crystalline material is expansible upon fusion and is fusible in the operating range of the element. A material of this general type is described in U.S. Pat. No. 2,259,846, although other materials having similar properties may be used.

The fusible material when combined with other materials will undergo its change of state in the desired range of operation of the element, to form a motive material. The motive material may be selected in accordance with the required operation range of the element.

As illustrated in FIGS. 1 and 2 of the drawings, the metal bellows 33 is extended at the normal temperature range of the thermally responsive material and holds the valve 25 open against the bias of the spring 30. As the temperature of the refrigerant in the evaporator reaches a temperature which would cause freezing of the condensate on the evaporator coils, the temperature of the refrigerant passing from the evaporator through the housing 21 will be reduced. The thermally responsive material carried in the bellows 33 and cup-like casing 31 will then tend to contract. This will reduce the flow of gas from the evaporator to the compressor and thereby cause the evaporator temperature to remain above a temperature which would freeze condensate on its coils or fins, and at times completely block air flow through the coils while the air-conditioning system runs at full capacity.

It should here be noted that while the gas is shown as entering the valve housing and flowing along the bellows 33, past the valve 25 to the compressor, along the spring 30 and casing 31, that the valve and flow may be reversed with the flow through the valve along the casing 31, and spring 30 against the expansible bellows 33 and out of the valve housing into the compressor through the passageway 26. The control, therefore, will operate with flow in either direction. With flow in a reverse direction from that shown and the valve reversed so the end of the valve housing, which was formerly its inlet end connected with the compressor head, the forces due to pressure drop across the valve will be compensated for by the relatively incompressible wax bellows.

It may be seen from the foregoing that a simple and inexpensive temperature regulated flow control element has been provided, which may be threaded in the suction head of the compressor of an air-conditioning system, and affords direct communication between the evaporator and suction side of the compressor and consists simply in a bellows element and cup-like casing and maintained open against the bias of its biasing spring upon normal evaporator temperature conditions, and moving toward a closed position to restrict the flow of gas from the evaporator to the suction side of the compressor as the temperature of the refrigerant gas drops to a point where freeze-up of the evaporator coils or fins could occur.

I claim as my invention:

1. A thermally responsive element, particularly adapted to control the flow of refrigerant gases to a compressor of a refrigerating system and to avoid freeze-up of the evaporator coils of the refrigerating system, comprising;

a housing having an end wall;
an inlet into said housing adjacent one end thereof;
an outlet from the opposite end of said housing;
an internal frusto-conical valve seat within said housing intermediate the ends thereof;
a poppet valve engageable with said seat;
spring means seated at one end in said housing and its opposite end on said valve and biasing said valve into engagement with said valve seat; and
an extensible thermally responsive element within said housing including an expansible bellows extending from said poppet valve and engageable with said end wall and containing a fusible thermally responsive material;
said thermally responsive element opposing said spring means and maintaining said valve open when in an extended position and retracting upon reductions in temperature to effect a reduction in flow through said valve seat upon temperatures tending to cause freeze-up of the evaporator coils of the refrigerating system;
said thermally responsive element carrying said valve at the opposite end of said bellows from the end of said bellows engaging said end wall and in axial alignment with said bellows;
said thermally responsive element including a cup-like casing in communication with said extensible bellows and in axial alignment therewith and with said bellows;
said valve extending about and carried by said cup-like casing;
said valve seat being intermediate the end of said housing and formed integrally therewith;
said housing being coupled at one end thereof to the head of a compressor;
said outlet including an annular member mounted within the outlet end of said housing;
said annular member forming a seat for said spring and being removable to accommodate the removal of said valve and thermally expansible element from the outlet end of said housing.

* * * * *